(12) United States Patent
Fabi Moreira et al.

(10) Patent No.: US 12,153,607 B2
(45) Date of Patent: Nov. 26, 2024

(54) METHOD AND SYSTEM FOR PRODUCING A GLOBAL MULTILAYER CARTOGRAPHIC DATA BASE

(71) Applicant: T-JUMP TECNOLOGIAS LTDA, Valinhos (BR)

(72) Inventors: Laila Fabi Moreira, Valinhos (BR); Shaila Fabi Moreira, Valinhos (BR); Dieter Lubeck, São Jose dos Campos (BR)

(73) Assignee: T-JUMP TECNOLOGIAS LTDA, Valinhos (BR)

( * ) Notice: Subject to any disclaimer, the term of this patent is extended or adjusted under 35 U.S.C. 154(b) by 427 days.

(21) Appl. No.: 17/441,445

(22) PCT Filed: Mar. 22, 2019

(86) PCT No.: PCT/BR2019/050099
§ 371 (c)(1),
(2) Date: Sep. 21, 2021

(87) PCT Pub. No.: WO2020/191465
PCT Pub. Date: Oct. 1, 2020

(65) Prior Publication Data
US 2022/0164375 A1    May 26, 2022

(51) Int. Cl.
*G06F 16/29* (2019.01)
*G06Q 50/10* (2012.01)
(Continued)

(52) U.S. Cl.
CPC ............ *G06F 16/29* (2019.01); *G06Q 50/10* (2013.01); *G06T 11/00* (2013.01); *G06T 17/05* (2013.01)

(58) Field of Classification Search
CPC ......... G06F 16/29; G06Q 50/10; G06T 11/00; G06T 17/05
See application file for complete search history.

(56) References Cited

U.S. PATENT DOCUMENTS 9,129,355 B1 *  9/2015  Harvey ................. G06V 10/44
9,798,928 B2    10/2017  Fox-Rabinovitz et al.
(Continued)

FOREIGN PATENT DOCUMENTS

BR     102018001027 A2      7/2019
EP          2597422 A2      5/2013
KR      20180131932 A  *  12/2018

OTHER PUBLICATIONS

International Search Report issued on Aug. 20, 2019 in corresponding International application No. PCT/BR2019/050099; 7 pages.

*Primary Examiner* — Xin Sheng
(74) *Attorney, Agent, or Firm* — Maier & Maier, PLLC

(57) ABSTRACT

A method and system for producing a global multilayer cartographic database enabling the production of maps and, more particularly, to the production of maps containing topographic, altimetric, vegetation cover, soil nature and subsidence information. through a collaborative process of using remote sensing systems carried by drones (DBSS), where information collected during individual surveys is incorporated into a global multilayer cartographic database, whose information is made available to amateur and professional parties. The system includes, in addition to the global multilayer cartographic database (BCGMC), an applications databank, a production infrastructure, an intermediation system service and a database of accredited operators.

5 Claims, 7 Drawing Sheets

(51) Int. Cl.
*G06T 11/00* (2006.01)
*G06T 17/05* (2011.01)

(56) References Cited

U.S. PATENT DOCUMENTS

| | | | |
|---|---|---|---|
| 2016/0156842 A1* | 6/2016 | Baldwin | H04N 23/66 |
| | | | 348/218.1 |
| 2016/0306355 A1* | 10/2016 | Gordon | G06Q 10/06312 |
| 2017/0063997 A1* | 3/2017 | Zhu | G07C 5/0808 |
| 2017/0081026 A1* | 3/2017 | Winn | G06Q 20/102 |
| 2018/0182146 A1* | 6/2018 | Laaksonen | H04N 1/32144 |
| 2020/0202386 A1* | 6/2020 | Fowe | H04W 4/23 |

* cited by examiner

METHOD AND SYSTEM FOR PRODUCING A GLOBAL MULTILAYER CARTOGRAPHIC DATA BASE

FIELD

The present invention concerns the production of maps and, more particularly, to the production of maps containing topographic, altimetric, vegetation cover, soil nature and subsidence information.

BACKGROUND

The current availability of small UAV platforms—unmanned aerial vehicles—popularly known as "drones", with the ability to carry radar, photography and other equipment, has brought alternatives to traditional processes for collection of topographic and geographic data, at a cost advantageously lower than that of those processes.

Patent document US2016306355 (A1) named Autonomous Drone Service System describes a service intended for users who do not own drones, who can request one or more services such as package delivery, video footage, crop monitoring, road and highway patrolling, and so on. Said services use a database in which available drones are registered and their characteristics such as photo camera type (standard or high definition), video camera type, data streaming function, maximum payload, maximum speed and flying height, maximum range and so on, allowing selection of the equipment able to meet the requirements of the requested service.

The system described in the abovementioned document does not include the possibility of drawing up topographic charts or maps, but merely provides images or videos of selected areas, thus being of limited usefulness.

Moreover, the information collected by said system is limited to the visual aspects resulting from the acquisition of images and does not provide data regarding the nature of the monitored areas. For instance, when surveying a forest, said information is restricted to top of the vegetable canopy, and does not comprise any data related to the tree height or the nature of the underlaying land.

It is also important to note that such surveys provide isolated cartographic information, in a format that hinders their integration into regional or global maps, in order to make them more detailed.

Existing global cartographic bases, such as Google Earth and NASA, published on scales ranging from 1:100,000 to 1:5,000,000 provide information to both professional and amateur users. Such databases use data captured by satellites equipped with cameras and radars, and do not provide accuracy and resolution for scales better than 1:100,000. In addition, they merely show the top of the canopy in areas covered by vegetation or of the soil in areas devoid of vegetation.

Since there is no global cartographic information covering the scales between 1:500 and 1:50,000, the interested parties needing more detailed cartographic data must resort to specialized and high-cost services, as exemplified in the above-mentioned patent document.

SUMMARY

In view of the above, it is an object of the present invention to provide a method for creating a global cartographic database covering the scales between 1:500 and 1:50.000.

Another object is the provision of a low-cost method that can be implemented by non-specialists.

Another object is to allow the creation of a global cartographic base that provides, in addition to topographic and altimetric information, data such as the height of the vegetation, the nature of the soil and its surface layer and the subsidence of the ground.

The abovementioned objects, as well as others, are achieved by the invention through a collaborative process of use of remote sensing systems transported by drones (UAV's), wherein the informations collected during individual surveys are included into a multi-layered global cartographic data base whose information is made available to amateur and professional parties.

Another feature of the invention comprises the provision of an applications data base which is continuously updated by various developers or suppliers. These applications enrich and expand the range of the UAV's utilizations.

According to another feature of the invention said updating is cumulative and does not suppress the previously registered data, allowing the comparison of changes occurred over time in the area of interest.

According to another feature of the invention, an intermediation service is provided enabling public access to UAV operators/managers and their individual application facilities. This service generates an available UAV database in which UAV systems as well as accredited operators are listed.

According to another feature of the invention, the accreditation of each operator comprises an assessment of the respective competence based on the quality of any job previously performed.

According to another feature of the invention, the accreditation of each operator who has not performed previous work comprises the transfer of a job and verification of compliance with quality specifications.

According to another feature of the invention, said facilities database comprises, in addition to accredited operators, their UAV's and their applications software, information about the features of HW and SW facilities installed in said UAV's, comprising the means for remote sensing, navigation and communications.

According to another feature of the invention, the data collected during the flight are processed, made available to the operator and stored for further block transfer to said centralized global multi-layer cartographic base.

According to another feature of the invention, the system comprises an operator equipped with processing means and communication links to an applications database, a facilities database and the global multi-layer cartographic database.

BRIEF DESCRIPTION OF THE DRAWINGS

Further features and advantages of the invention will be better understood by the description of an exemplary non-limiting embodiment and the figures that refer to it, in which.

DETAILED DESCRIPTION OF THE EMBODIMENTS

Figure 1:
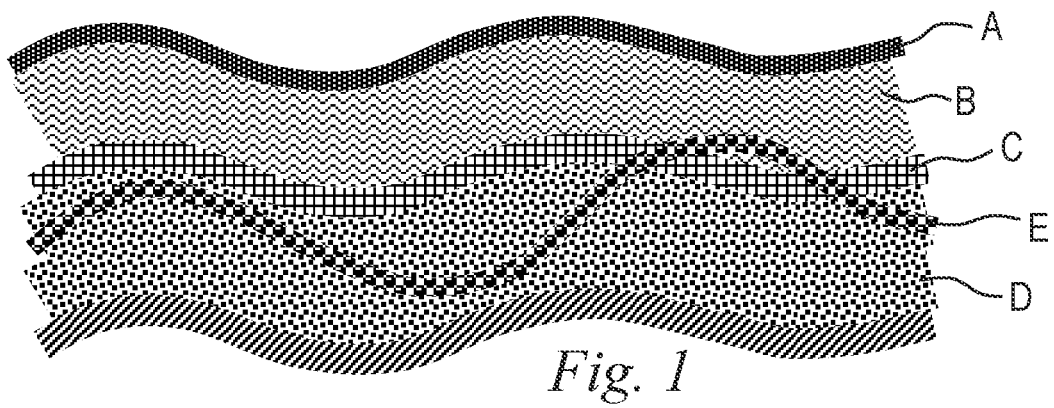
FIG. 1 is a section view of the ground showing several layers that can be determined by means of the invention.
Figure 2:
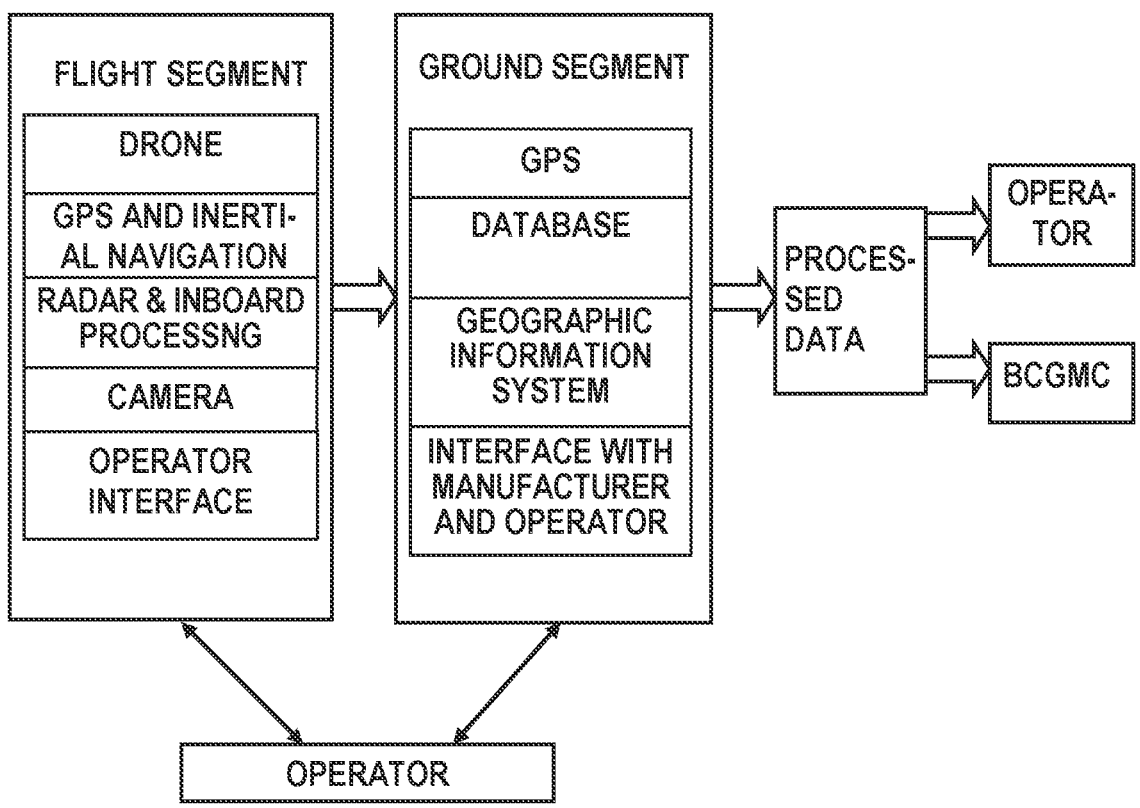
FIG. 2 is a general view of the system of the invention.

As shown in FIG. 1, the important features of the terrain include, in addition to surface data, other key aspects for certain applications. In this figure, the following layers are shown:

layer A is the image of the surface, such as seen by cameras on board satellites;

layer B shows the height of the vegetation cover;

layer C shows the image and height of the soil with or without vegetation;

layer D is a tomography of the surface layer of the soil;

layer E shows the ground subsidence;

layer T refers to the dates of the surveys carried out by the UAV.

The information obtained through each survey is stored in the global multi-layer cartographic database and can be retrieved by the interested party, allowing to verify the evolution of the abovementioned terrain features in the area of interest.

The instant invention's main concept comprises the surveying carried out by a plurality of UAV's furnished with remote sensing meajs, operating in collaboration, forwarding the data collected in cartographic surveys to a centralized database, said data being processed in order to generate a global cartographic database. Said database is dynamically updated upon the receipt of new information.

The equipment used, designated as DBSS (remote sensing system transported by drone) comprises a drone capable of carrying a radar and a multi-band camera, as well as real-time processing means of the collected information and is intended to fly at low height, such as 120 m above the ground, so that it can be operated by non-technical users and without any specific license.

Figure 3:
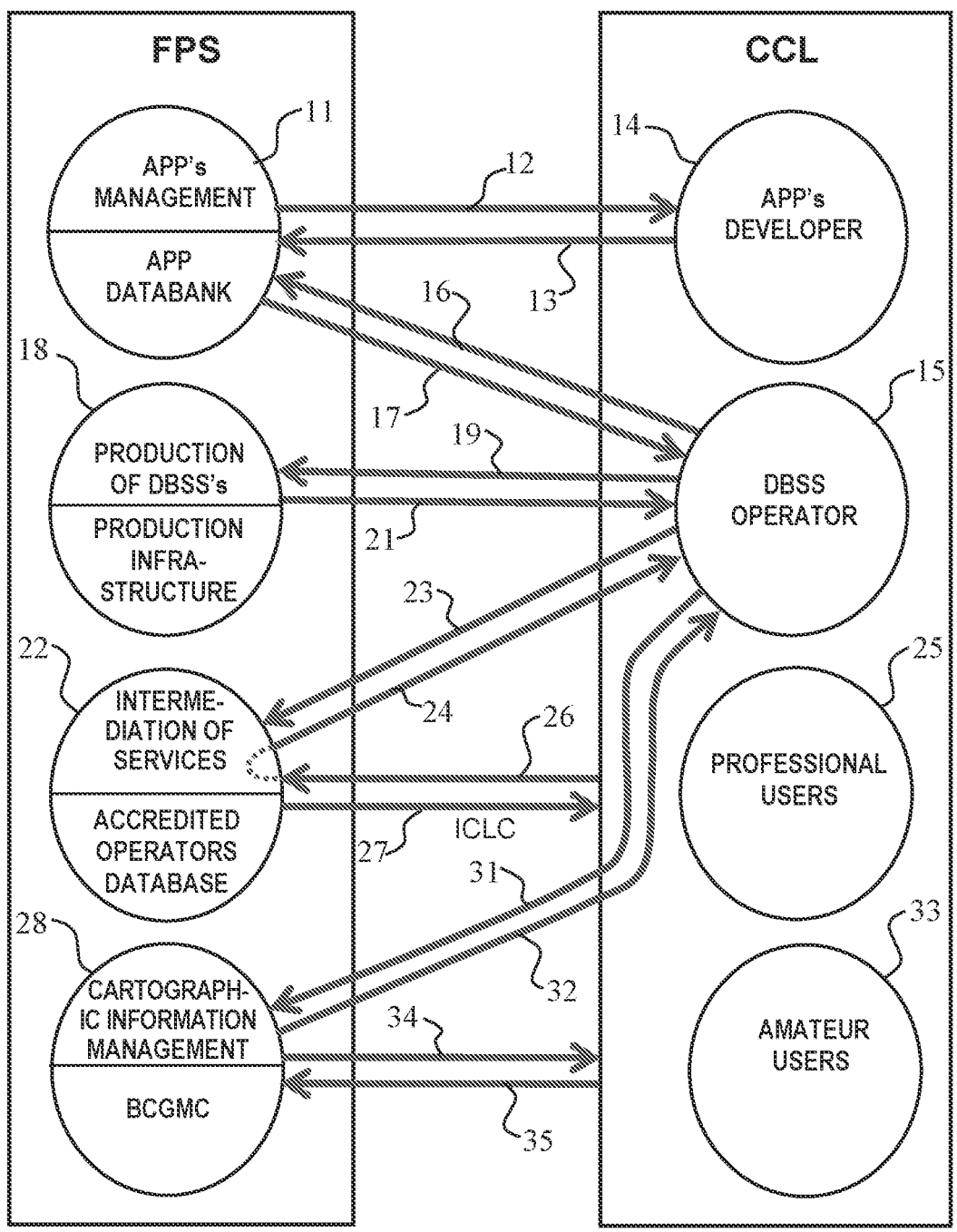
FIG. 3 is a second view of the system showing the information flows between its elements.
Figure 4:
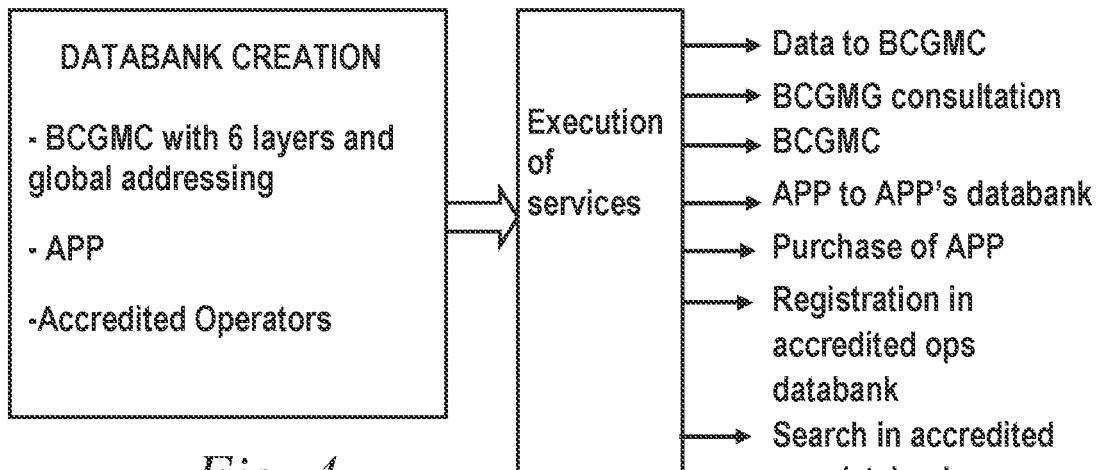
FIG. 4 is a diagram view of the creation of the databases employed in the invention.
Figure 5:
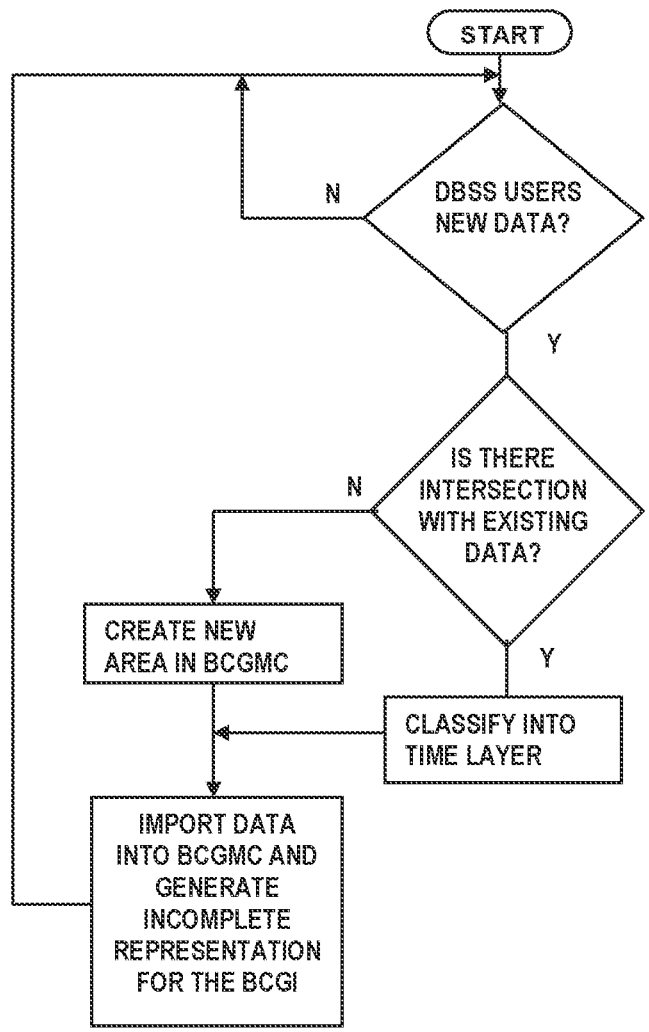
FIG. 5 is a flowchart that shows the routing to the database of the data collected by the UAV.
Figure 6:
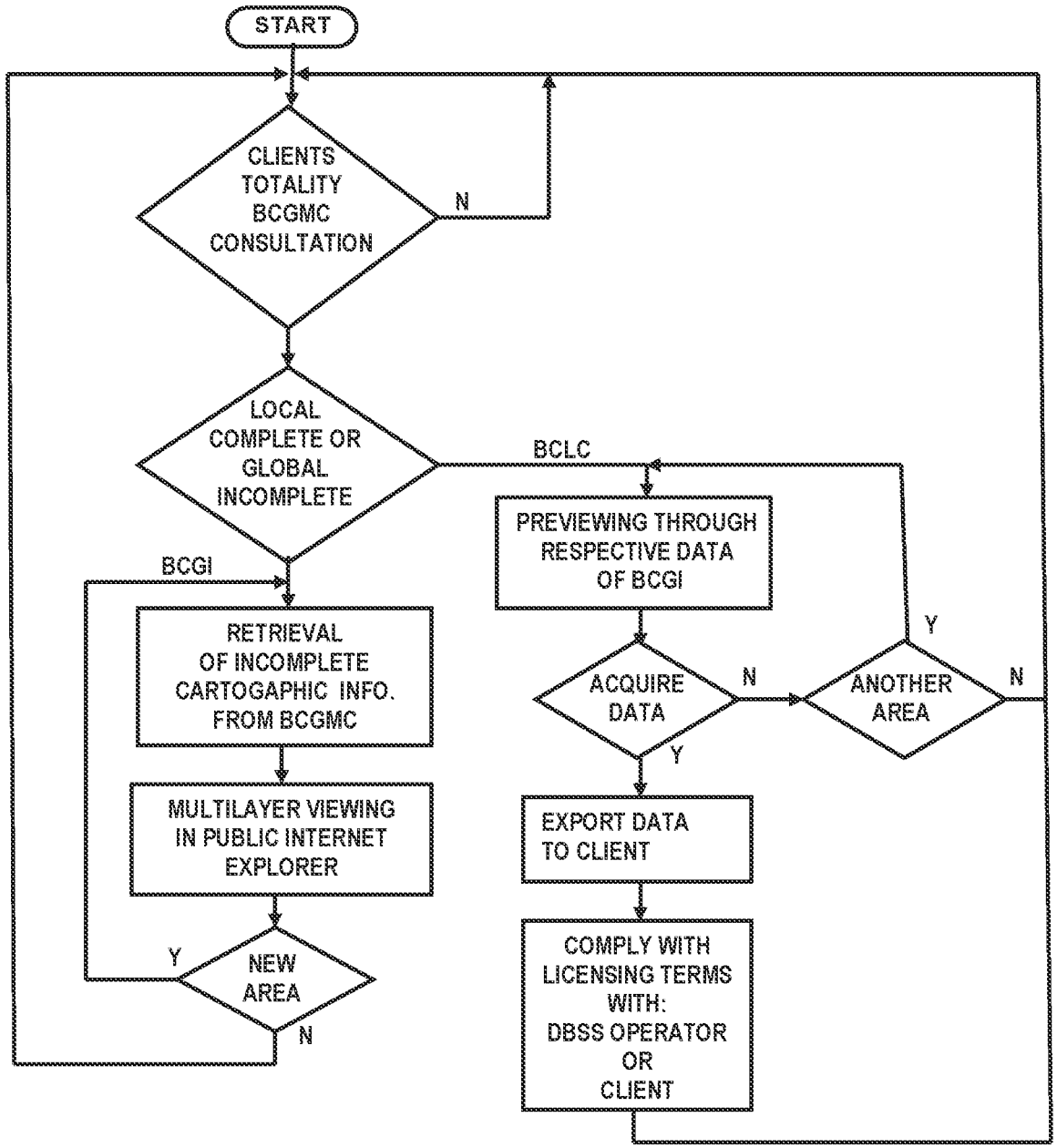
FIG. 6 is a flowchart showing the consultation routine to the global multilayer cartographic database.
Figure 9:
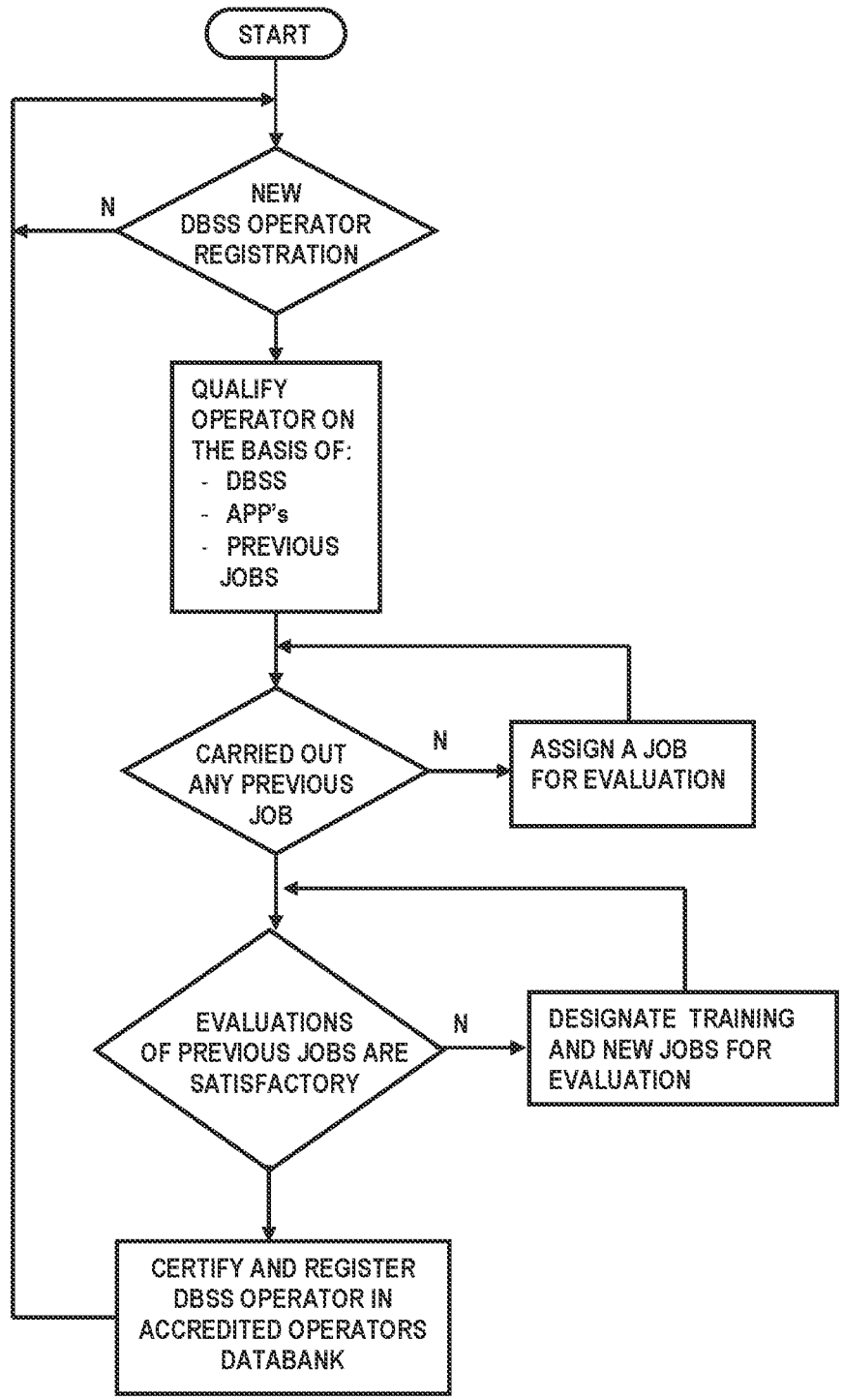
FIG. 9 shows how an operator is registered in the accredited operators databank.
Figure 10:
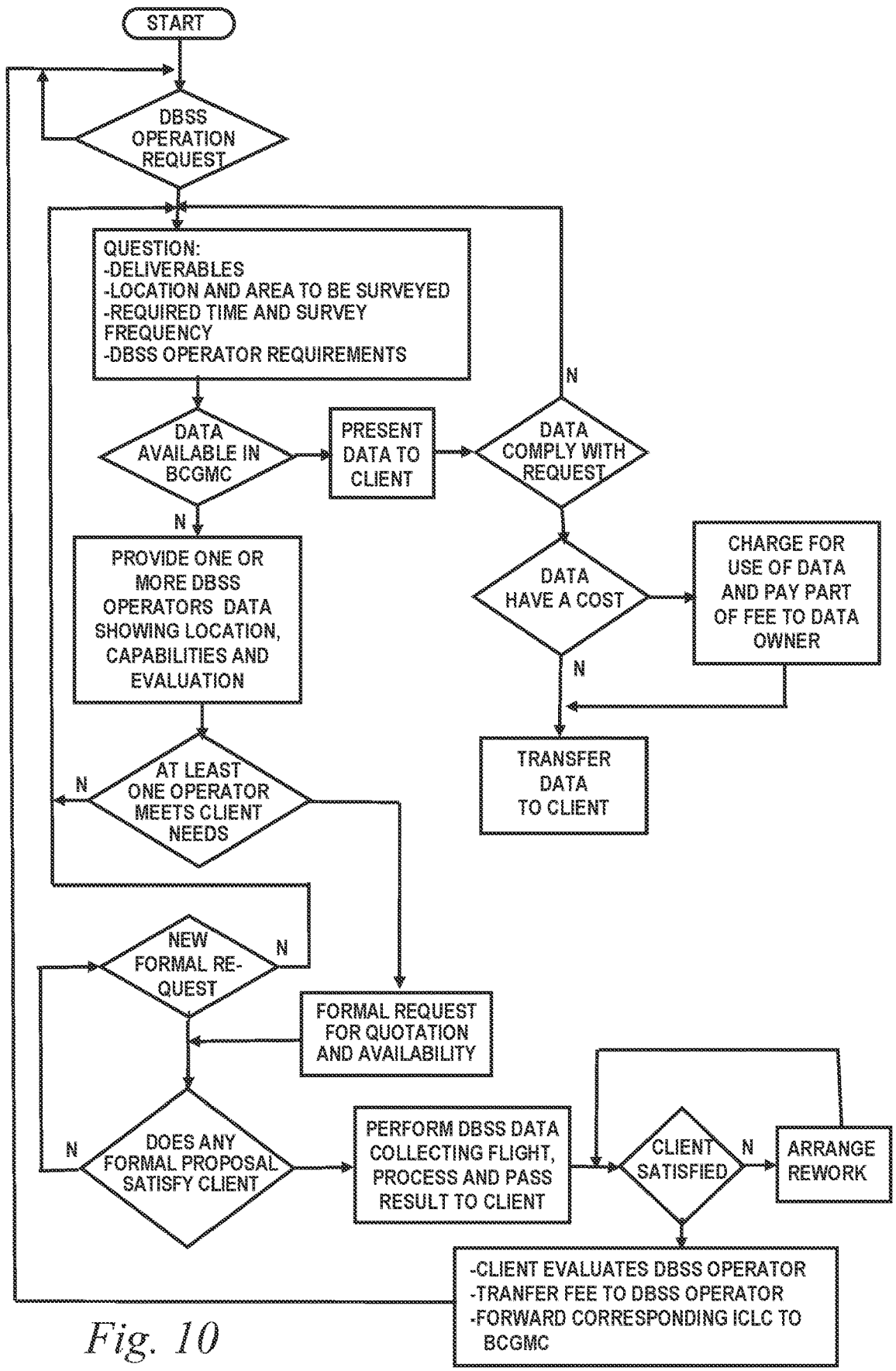
FIG. 10 shows the search routine in the UAV operators databank in order to select the best qualified one for the job.

As shown in FIG. 3, the system comprises two blocks, the supplier/integrator block (FPS) and the customer block (CCL). The supplier/integrator block—which is responsible for the resources needed for the production, marketing and use of the global multi-layer database and cartographic database—comprises:

application program manager 11 comprising an asset that is an own application program databank or broker for client-developed app's (APP), which are application programs related to the use of drones for various applications, such as: agriculture, mining, reforestation, environment. They can be developed by the supplier/integrator, one or more application developer 14 or by a customer and made available to other interested parties either freely or by payment of a fee;

UAV manager 18 comprising engineering and production infrastructure data of UAV's as an asset and storage means of performance information and UAV availability;

Intermediation of services 22 comprising an asset that is the accredited operators database, allowing the location and hiring of service providers that use UAV's. The accreditation is carried out according to the flowchart of FIG. 9 in the supplier/integrator block FPS by a computer system connected to the Internet, through evaluation of the operator's assets: knowledge of UAV characteristics, knowledge of the app's, the training undergone by the operator and the grade obtained, as well as the degree of performance in meeting the requests for surveys made by the professional parties 25, if any;

Cartographic information management 28 comprising an asset consisting of the global multilayer cartographic base (BCGMC) where the information obtained through the UAV's is stored. Two kinds of public access to BCGMC information are available:

the first, Complete Local Cartographic Information (ICLC), is only accessible via the Internet through payment of a fee, providing the information from layers A to E and T, and can be imported by any Geographic Information System, GIS;

the second, Global Incomplete Cartographic Information (ICGI), is available free of charge on the Internet, and the public, amateur or professional, has access only to the visualization of the information, but there is no way to obtain the vectors, attributes or other structured information.

Figure 7:
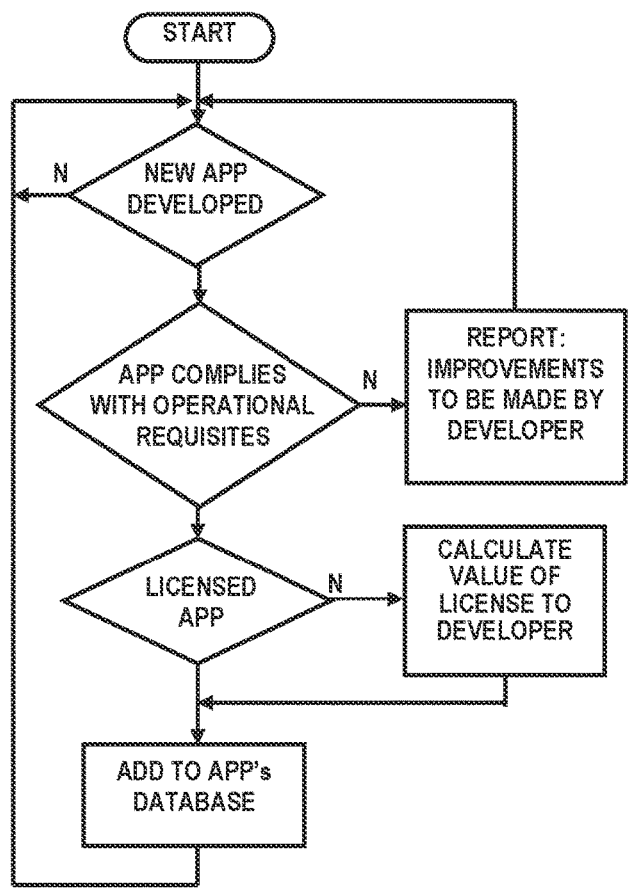
FIG. 7 shows how a new application is added to three SW database.
Figure 8:
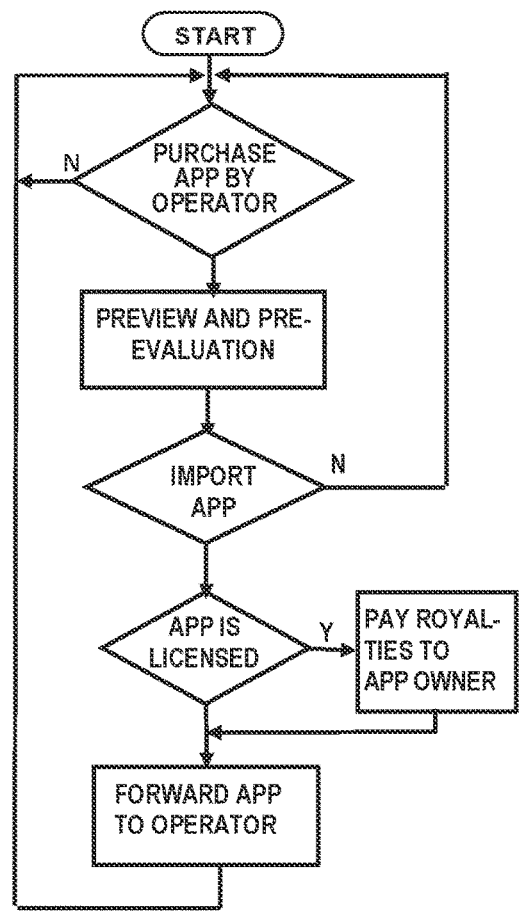
FIG. 8 shows how a new application is bought sand is transferred to a client.

The clients block (CCL) comprises the following:

app developers 14, who develop applications to extend the functionality and capabilities of UAV's. When answering a request from the application manager 11, the interaction with the system is shown in the flowchart of FIG. 7. Should the app been developed independently of such a request, the inclusion into the system takes place as shown in FIG. 8. The provision of the app may be through payment or free of charge;

UAV operator 15, can use its own UAV or provide services as a UAV user furnished by third parties. Each time a UAV is used, the collected data are processed and automatically sent to BCGMC 28 ensuring the collaborative nature of the cartographic database creation;

Professional users 25 are the ones that require complete cartographic information and pays to obtain such information;

Amateur users 23 who have partial access to cartographic information for inspection.

Still referring to FIG. 3, the system components interact as described below:

Communication 12 corresponds to the request for development of an app by developer 14 according to specifications provided by app management;

Flow 13 corresponds to the furnishing of the app produced by the developer for the app management 11. According to the flowchart of FIG. 7 this application is then subjected to a quality control, in order to verify that it meets operational requirements; if this does not occur, said management forwards to the developer a report pointing out what improvements are needed;

Flow 16 indicates the request made by an operator 15 for an existing app in databank 11, the furnishing of said app being performed as shown by 17.

The sequence of steps involved in a survey begins with a request 26 for the collection of cartographic data sent to the intermediation of services 22;

In turn, the intermediation of services 22 verifies the availability, flow 24, of one or more qualified operators in the concerned region;

In turn, operator 15 returns the information collected by the DBSS, flow 23, to the intermediation of services 22, which, in turn, sends this information (ICLC) to the requester, flow 27, which is also charged for the service. Part of that fee shall be passed on to the operator 15;

At the same time, cartographic information management 28 is fed with the same data (ICLC), flow 31, which are incorporated into the global multi-layer cartographic base (BCGMC);

In turn, operator is paid for his/her work, flow 32;

Amateur users 33 can also request 35 access to BCGMC information, receiving the paid ICLC information or the free ICGI information, according to flow 34.

The invention claimed is:

1. A method for creating a global multilayer cartographic database that allows the production of maps containing one or more information of the group comprising topographic and altimetric information, vegetation height, the nature of the soil and the ground subsidence comprising incorporation, to a dynamically updated global multi-layer cartographic basis (BCGMC), of information collected during individual surveys, wherein said surveys comprise the following steps:
   request made by the public clients block (CCL), for the collection of cartographic data sent to the intermediation of services;
   consultation made to a remote sensing system transported by a drone (DBSS) operator, of the availability of qualified operators in the concerned region;
   survey carried out by the DBSS;
   transfer of the information collected by the DBSS to the intermediation of services;
   forwarding of the information to requesting party and charging fee if applicable;
   payment of part of the fee to operator;
   forwarding of said information to cartographic information management to be included in global multilayer cartographic database (BCGMC),
wherein the collaborative use of said information comprises:
   providing apps developed by suppliers, application developers or customers;
   including said apps into an app databank.

2. A method as claimed in claim 1, wherein tracking of changes over time of the topographic, altimetric, vegetation cover, soil nature and subsidence information is provided by the cumulative addition of said information to the global multilayer cartographic database (BCGMC).

3. A method as claimed in claim 1, wherein registration of qualified operators comprises a technical evaluation comprising the knowledge of DBSS, of the app's, as well as the performance of said operators on previous jobs.

4. A system for creating a global multilayer cartographic database, comprising:
   a global multilayer cartographic database (BCGMC) in which there are cumulatively stored and updated the information collected during individual surveys carried out by remote sensing systems carried by drones (DBSS) outfitted with a radar and a multi-band camera, wherein said storage and updating does not suppress the previously registered data, allowing the comparison of changes occurred over time in an area of interest;
   a continuously updated applications databank;
   a databank of operators accredited by either the assessment of the respective competence based on the quality of any job previously performed or the verification of compliance with quality specifications.

5. A system as claimed in claim 4, wherein it is composed of two blocks, comprising:
   the supplier/integrator block (FPS), in charge of production, marketing and use of the database and of the global multilayer cartographic database, comprising the app's manager, the DBSS manager, the intermediation of services and the cartographic information management;
   the clients block (CCL), comprising the app developers, the DBSS operator, the professional users which pay for the complete cartographic information (ICLC) and the amateur users which access the incomplete cartographic information (ICGI).

* * * * *